United States Patent
Peters et al.

(10) Patent No.: US 8,268,217 B2
(45) Date of Patent: Sep. 18, 2012

(54) METHOD AND DEVICE FOR ENCAPSULATING ELECTRONIC COMPONENTS WITH A CONDITIONING GAS

(75) Inventors: Hendrikus Johannes Bernardus Peters, Didam (NL); Arthur Theodorus Johannes Reijmer, Didam (NL); Franciscus Bernardus Antonius De Vries, Elbergen (NL); Johannes Lambertus Gerardus Marla Venrooij, Dulven (NL)

(73) Assignee: Fico B.V., RW Duiven (NL)

( * ) Notice: Subject to any disclaimer, the term of this patent is extended or adjusted under 35 U.S.C. 154(b) by 633 days.

(21) Appl. No.: 11/632,621

(22) PCT Filed: Jul. 14, 2005

(86) PCT No.: PCT/NL2005/000509
§ 371 (c)(1),
(2), (4) Date: Feb. 15, 2008

(87) PCT Pub. No.: WO2006/009429
PCT Pub. Date: Jan. 26, 2006

(65) Prior Publication Data
US 2009/0026649 A1  Jan. 29, 2009

(30) Foreign Application Priority Data

Jul. 16, 2004 (NL) .................................... 1026670
Apr. 29, 2005 (NL) .................................... 1028905

(51) Int. Cl.
*B29C 45/14* (2006.01)

(52) U.S. Cl. ................................................. 264/272.11
(58) Field of Classification Search ............. 264/272.11; 438/127; 257/787
See application file for complete search history.

(56) References Cited

U.S. PATENT DOCUMENTS

| 2,893,061 | A | 7/1959 | Terry, Jr. |
| 4,435,953 | A | 3/1984 | Schmid et al. |
| 2006/0160275 | A1 * | 7/2006 | Weggen et al. ............... 438/127 |

FOREIGN PATENT DOCUMENTS

| EP | 0 606 648 A2 | | 7/1994 |
| EP | 1 312 454 A2 | | 5/2003 |
| JP | 59140019 | | 8/1984 |
| JP | 061172711 | | 8/1986 |
| JP | 02156644 | | 6/1990 |
| JP | 05096558 | | 10/1991 |
| JP | 03281210 | | 12/1991 |
| JP | 09300386 | | 5/1996 |
| JP | 10034694 | | 2/1998 |
| JP | 2000280298 | | 4/1999 |
| JP | 2000263603 | | 9/2000 |
| JP | 2002187175 | | 7/2002 |
| WO | WO2004/070838 | * | 8/2004 |

* cited by examiner

*Primary Examiner* — Larry Thrower
(74) *Attorney, Agent, or Firm* — The Webb Law Firm, PC

(57) ABSTRACT

The invention relates to a method for encapsulating electronic components in a mold by the processing steps of: A) placing the electronic component for encapsulating in a mold cavity, and B) feeding an encapsulating material to the mold cavity, wherein at least a part of the mold surface defining the mold cavity is brought into contact with a conditioning gas containing a decreased oxygen concentration relative to the atmosphere. The invention also relates to a device for encapsulating an electronic component, in particular a semiconductor, with encapsulating material.

11 Claims, 2 Drawing Sheets

METHOD AND DEVICE FOR ENCAPSULATING ELECTRONIC COMPONENTS WITH A CONDITIONING GAS

BACKGROUND OF THE INVENTION

1) Field of the Invention

The invention relates to a method for encapsulating electronic components in a mould. The invention also relates to a device for encapsulating an electronic component, in particular a semiconductor, with encapsulating material.

2) Description of the Prior Art

The encapsulating of electronic components, such as semiconductor circuits in particular, is applied on large scale. The electronic components are here usually mounted on a carrier ("leadframe", "board") and such a carrier is clamped between mould parts such that a mould cavity is defined around electronic components mounted on the carrier. An important consideration here is that the adhesion of the encapsulating material to the mould during curing of the encapsulating material must remain limited so as to thus prevent damage to the encapsulated products and to prevent contamination of the mould. There are various solutions for limiting the degree of adhesion between encapsulating material and mould. Use can thus be made of a layer of foil material separating the encapsulating material and the mould. This solution is expensive and not possible for all mould embodiments. Another solution employed on a large scale heretofore is to provide a mould part, optionally locally, with a specific coating (for instance a coating with an increased concentration of Cr and/or TiN) optionally in combination with the application of a temporary coating (such as a wax layer). At first use or after a period of standstill mould parts are in practice first conditioned by carrying out some dummy encapsulating runs such that conditioning material from the encapsulating material leaves a (temporary) coating on a mould part during these dummy encapsulating runs. When there is an undesirable increase in the adhesion between the encapsulating material and a mould part during performing of successive encapsulating operations, the usual option is to take the mould part or parts out of production for a time and to clean the mould parts for a longer period with a specific cleaning material (such as for instance melamine). The existing solutions for limiting the adhesion between encapsulating material and mould part, with methods and in devices as described in the preamble, are: that the adhesion can still develop undesirably high values, that the process of the increase of the adhesion during use is not wholly predictable and understandable, that mould parts are unusable for part of the time and that production losses occur.

The Japanese patent JP 03 281210 describes a method for encapsulating an electronic component with resin, wherein the encapsulating process takes place in an inert gas environment. It is thus possible to prevent air inclusions occurring in the encapsulating material and the surface of an moulded housing being provided with recesses or fragmented parts. Use is made here particularly of a nitrogen atmosphere.

Japanese patent JP 02 156644 discloses a method to release an encapsulated semiconductor device from a metal mould cavity, wherein an ejector pin is used to eject a moulded part from the cavity. A gas, such as air, nitrogen or the like is additionally discharged directly into the cavity through a blow-off port, positioned immediately adjacent to the ejector pin.

Japanese patent 2000 263603 discloses a device and method to release a moulding from a mould without cracking. The disclosed device comprises a channel, which terminates directly into the mould cavity and through which resin can be sucked into the mould cavity. After moulding, the same channel is used to introduce compressed air into the mould cavity to release the moulding from the mould.

The object of the present invention is to provide an improved method and device for encapsulating electronic components in a mould, with which the problems resulting from adhesion between mould and encapsulating material can be limited.

SUMMARY OF THE INVENTION

The invention provides for this purpose a method for encapsulating electronic components in a mould by the processing steps of placing the electronic component for encapsulating in a mould cavity, and feeding an encapsulating material to the mould cavity, wherein at least a part of the mould surface defining the mould cavity is brought into contact with a conditioning gas containing a decreased oxygen concentration relative to the atmosphere, wherein at least a part of the conditioning gas is introduced from the contact side of the mould into the mould cavity during release of the encapsulating material from the mould cavity such that a releasing gas pressure is exerted on the encapsulating material, by the conditioning gas. The unexpectedly advantageous result of applying a conditioning gas such that it also exerts a releasing gas pressure on the encapsulating material is that multiple effects are achieved with a single measure. First of all it is possible to significantly reduce the adhesion between encapsulating material and mould part by bringing the mould cavity into contact with a conditioning gas. A conditioning gas with a decreased oxygen concentration relative to the atmosphere (or low-oxygen conditioning gas) is understood to mean a gas with less than 20.9% by volume, preferably less than 15% by volume or even more preferably less than 10% by volume of oxygen. Other examples of gases which can be used are inert gases, such as more or less pure nitrogen gas. The supplying of a gas is a very simple operation which can be realized with simple means and which is also simple to mechanize or to automate. Conversely, the use of a reducing gas (with which oxygen is bonded) also brings very advantageous results. During test with both nitrogen and reducing gases (optionally in combination) in the use of the conditioning gas very favourable results were achieved in reducing the degree of adhesion of the encapsulating material to the mould surface (also expressed in release force per unit area). The reduction in the degree of adhesion during a test with a TiN coating of the mould and nitrogen as conditioning gas came to more than 95%. This advantageous supply of conditioning gas is now performed according to the present invention such that a second advantageous effect is realized. With the specific method of supplying the conditioning gas is also achieved that a force is exerted on the encapsulated electronic components to be released. The conditioning gas can thus be introduced/pressed between the encapsulating material and the mould cavity. This simplifies release of the encapsulating material from the mould cavity. An additional advantage here is that this release force can be applied over a large area.

The encapsulating process can also be performed in an environment filled with conditioning gas. It thus becomes possible to have a mould cavity, respectively mould part or mould parts remain more or less constantly in a conditioned environment with only limited use of conditioning gas, which, depending on the conditions, will result in a further optimization of the desired effect of reduced adhesion.

In order to increase the efficiency of the contact between the conditioning gas and the mould part it is also advantageous if a flow of conditioning gas is guided along at least a part of the mould surface defining the mould cavity.

The gas pressure can advantageously be combined with more traditional release means so that the encapsulating material is also mechanically engaged at least locally for the purpose of exerting a release force. Here can be envisaged ejector pins, guide strips optionally provided with additional anchors, and so forth. It will be apparent that a combination of traditional release means and gas pressure will generate an even greater release capability.

The gas pressure is developed in advantageous manner between the side of the encapsulated electronic component directed toward a mould part and the shape-defining mould part. A side of the encapsulated electronic component directed toward a mould part can thus be released as a wave front from the shape-defining mould part.

The conditioning gas can also be preheated before it is brought into contact with the encapsulated electronic component and the mould cavity, this to prevent thermo-shock and/or to prevent undesirable cooling of the mould cavity/mould and/or the encapsulated electronic component. In order to further limit the gas consumption, it is desirable that the gas pressure is reduced after full release of a side of the encapsulated electronic component directed toward a mould part.

The present invention also provides a device for encapsulating an electronic component with encapsulating material, comprising at least two co-acting mould parts which are mutually displaceable between a moulding position, in which the mould parts take up a position for defining at least one mould cavity receiving the electronic component, and an opened position in which the mould parts are situated at a greater distance from each other than in the encapsulating position, feed means for encapsulating material connecting to the mould cavity, and supply means for a conditioning gas with a decreased oxygen concentration relative to the atmosphere, wherein the supply means for conditioning gas connect to a contact side of at least one of the mould parts. Such a device with an outflow opening arranged in a contact side of a mould cavity/mould part can be applied in advantageous manner particularly in the encapsulation of electronic components mounted on a carrier. The mould cavity or the mould parts are then usually provided here with a space for receiving such a carrier. It is noted that use is normally made of at least two, although optionally also more than two, mutually displaceable mould parts. The device will usually also be provided with drive means for mutually displacing the mould parts, generally an electric motor, and optionally with additional mechanical ejector means for exerting an additional release force on an encapsulated electronic component to be released. Save for specific supply means for the conditioning gas, such a device is commercially available, and modification of existing equipment can therefore been envisaged. For the further advantages of the device according to the invention reference is made to the advantages in respect of the above described method also forming part of the invention.

In yet another embodiment variant, the mould parts are enclosed by a screen. With such a screen a chamber can be formed which is at least partially gas-tight for the purpose of generating a local gas environment which encloses the mould parts and which differs from normal atmospheric gas conditions.

In yet another embodiment variant, the mould parts consist of a single material. That is, a specific coating which was required in the prior art to prevent adhesion of encapsulating material becomes unnecessary. Such coatings, such as a coating on the basis of nickel (for instance NiCrN) were applied to the surface of a mould part, and the applying of the coating results in a substantial increase in the cost price of the mould parts. According to the present invention such a coating is unnecessary.

According to the state of the art, the supply means for the conditioning gas usually connect onto a mould cavity in one of the mould parts. The conditioning gas is thus brought directly to the position where it can bring about a desired conditioning effect.

In yet another embodiment of the invention, the supply means can for instance connect to a venting and/or to a contact surface adjacently of the mould cavity. In addition to the advantages already mentioned above, it is also the case that applying a gas pressure is structurally a simple operation, this while the traditional release means acting in mechanical manner require very major structural measures in the mould parts. The ejector pins applied here must be integrated into the mould parts in a manner such that encapsulating material cannot penetrate between such pins and the remaining mould part. The outflow opening can be provided as desired with a displaceable closing element to enable the gas flow to be regulated therewith and to prevent contamination of the gas supply.

In a preferred variant an outflow opening is located on the same side of a mould cavity as that from which the encapsulating material is fed to the mould cavity. The encapsulation can thus be "peeled" away from the mould cavity from the feed side. The device can be additionally provided with at least one mechanical ejector.

It can also be advantageous to provide the gas supplying means with heating means so as to thus prevent undesired cooling of the mould parts as a consequence of the gas supply.

BRIEF DESCRIPTION OF THE DRAWINGS

The present invention will be further elucidated on the basis of the non-limitative exemplary embodiments shown in the following figures. Herein.

DETAILED DESCRIPTION OF THE PREFERRED EMBODIMENTS

Figure 1:
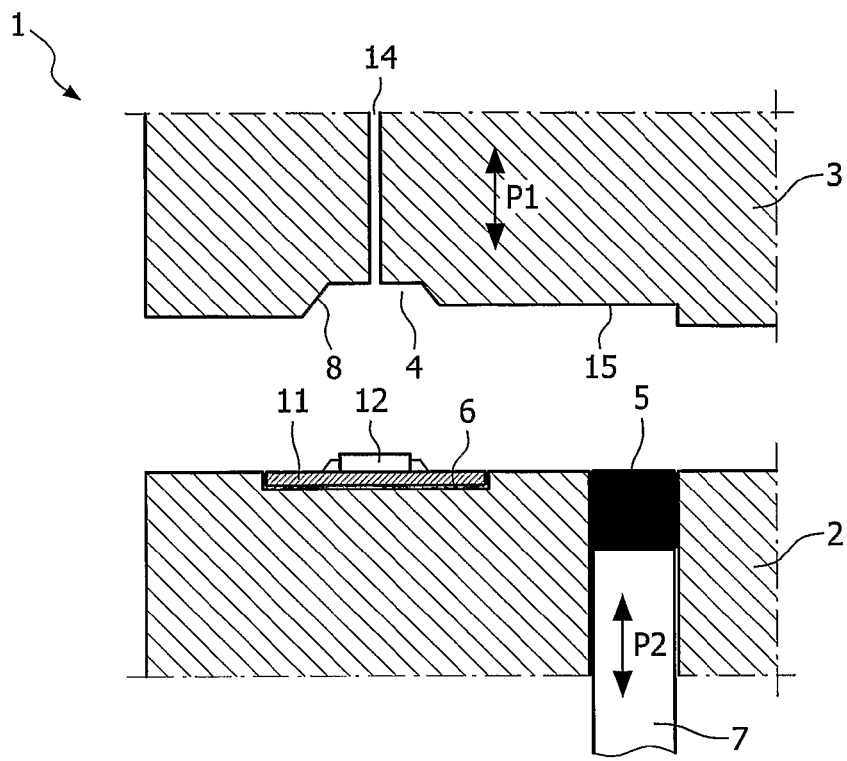
FIG. 1 shows a schematic cross-section through an encapsulating device according to the state of the art provided with supply means for a conditioning gas.

FIG. 1 shows an encapsulating device 1 with a lower mould part 2, relative to which an upper mould part 3 is displaceable as according to arrow P1. A mould cavity 4 is left clear in upper mould part 3 for the purpose of forming a housing, not shown in this figure, to be manufactured with encapsulating material 5. Arranged in lower mould part 2 is a recess 6 in which a carrier with an electronic component 12 is placed. Encapsulating material 5 can be forced to mould cavity 4 by a plunger 7 displaceable as according to arrow P2. Recessed into upper mould part 3 is an optionally closable channel 14 which connects to mould cavity 4. The conditioning gas is carried directly into mould cavity 4 through channel 14 and a force is simultaneously exerted on the (at least partially cured) encapsulating material 5 in order to release it from the contact side 8 of mould cavity 4.

Figure 2:
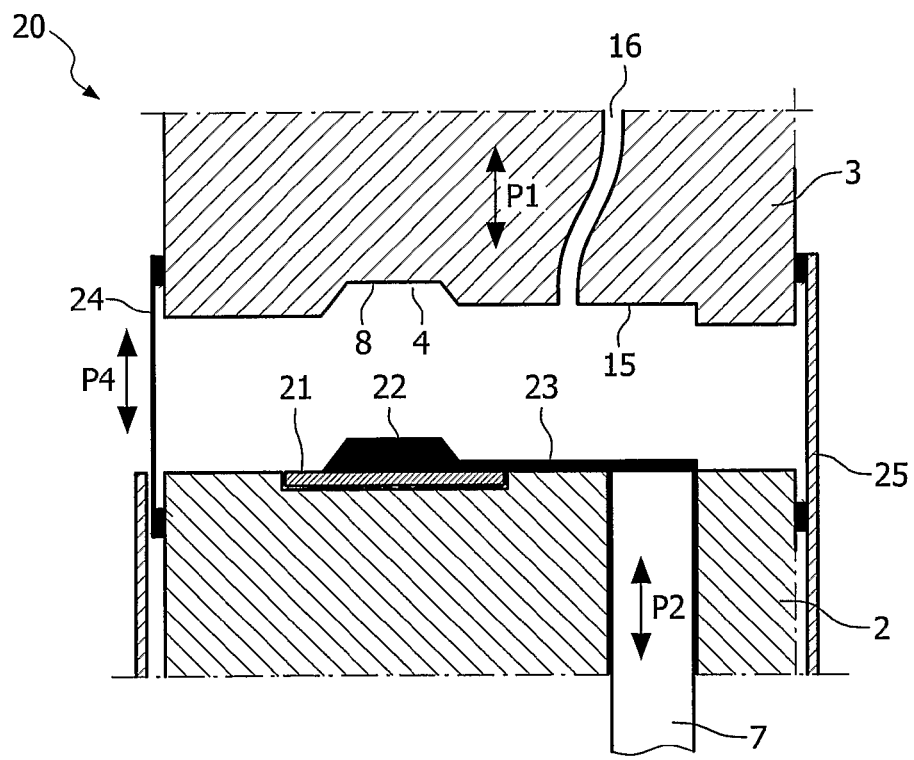
FIG. 2 shows a schematic cross-section through an alternative embodiment variant of an encapsulating device according to the invention.

FIG. 2 shows an encapsulating device 20 in which a carrier 21 is placed with a housing 22 of encapsulating material 5 arranged thereon. Also shown is a runner 23 which is formed by encapsulating material 5 cured in a feed channel. This runner 23 is usually separated in a subsequent processing of carrier 21. As an alternative to channel 14 (or additionally to channel 14) shown in FIG. 1, a supply channel 16 for conditioning gas can also connect at a position of the contact side 15 of upper mould part 3 such that the conditioning gas is blown against the runner 23. The space between mould parts 2, 3 is moreover bounded by a screen plate 24 and a second screen plate 25 displaceable as according to arrow P4. Owing to the screen means 24, 25 it is possible to maintain a gas environment between mould parts 2, 3 which differs from the environment.

Figure 3:
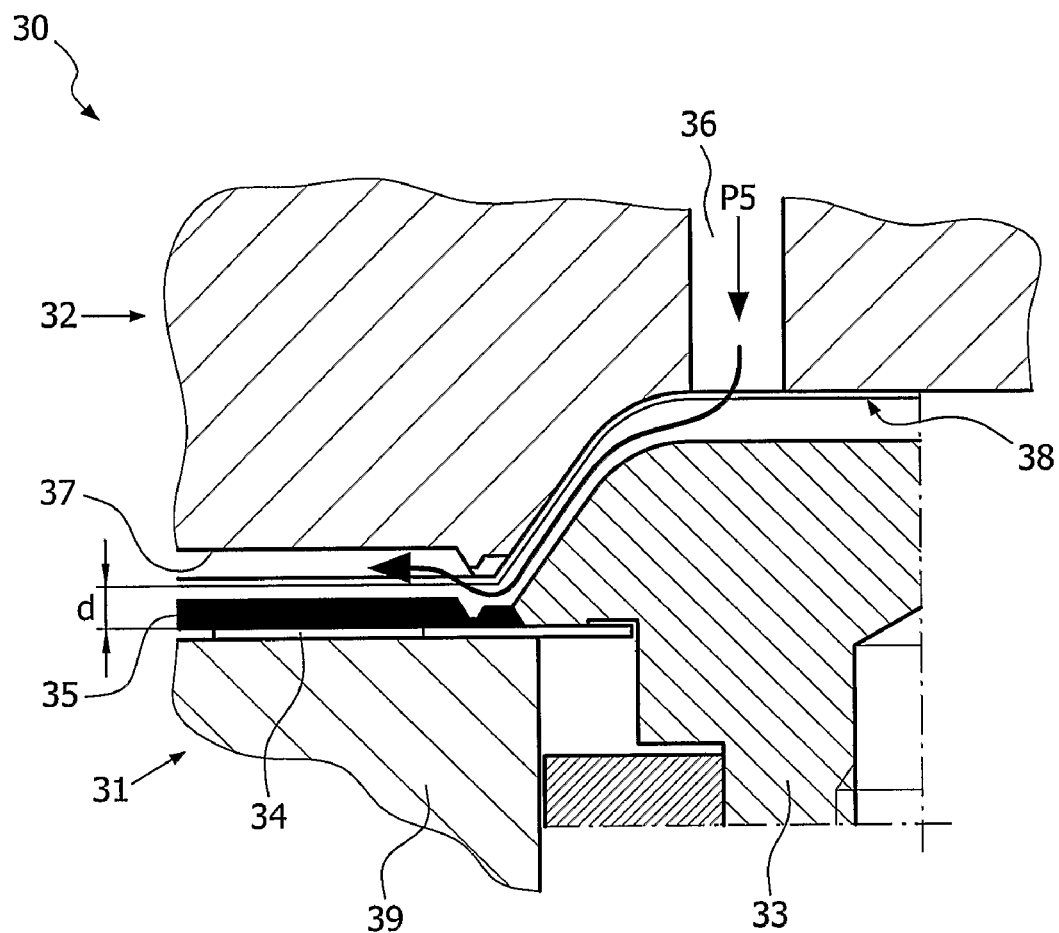
FIG. 3 shows a cross-section through a part of a second alternative embodiment variant, more particularly a so-called top edge variant, of an encapsulating device according to the invention.

FIG. 3 shows a part of an encapsulating device 30 with a lower mould part 32 assembled from a plurality of mutually displaceable components. A carrier 34 is clamped between a support 32 and an edge part 33 which are mutually displaceable such that encapsulating material 35 can be supplied over the top side of edge part 33. One of the advantages of using edge part 33 is that an edge zone of carrier 34 can thus be kept free of encapsulating material 35. Once the encapsulating material 35 has at least partially cured, mould parts 31, 32 can be moved apart (through for instance a small distance d of a few tenths of a millimetre, more specifically for instance 0.5 mm). By moving apart mould parts 31, 32 a supply channel 36 for feed of a conditioning gas is also opened, with the result that conditioning gas is supplied as according to arrow P5. This conditioning gas herein penetrates between the housing made of encapsulating material 35 and a mould cavity 38 in the contact side 37 of upper mould part 32. The conditioning gas will here fulfil a dual function: the gas pressure will exert a release force (for instance as a wave front) on the encapsulating material, whereby release of the encapsulating material 35 from mould cavity 38 is simplified and the conditioning gas moreover comes into contact in very specific manner with the contact side 37 of upper mould part 32, whereby the gas can carry out its conditioning action in efficient manner. The release of the encapsulating material 35 from mould cavity 38 can be initiated by moving the support 32 and the edge part 33 over a limited distance.

The invention claimed is:

1. A method of encapsulating electronic components in a mould comprising:
   (a) placing an electronic component for encapsulating in a mould cavity of a mould comprised of plural mould parts;
   (b) following step (a), feeding an encapsulating material to the mould cavity;
   (c) following step (b), releasing the encapsulating material by moving the mould parts apart over a limited distance to form a supply channel; and
   (d) following step (c), feeding conditioning gas having a decreased oxygen concentration relative to the atmosphere to a contact side of the mould via the supply channel formed in step (c), whereupon a releasing gas pressure is exerted on the encapsulating material by the conditioning gas which causes release of the encapsulating material from the mould absent mechanically engaging the encapsulating material and which simultaneously conditions the mould cavity to limit adhesion between the encapsulating material and the mould cavity.

2. The method as claimed in claim 1, further including, prior to step (c), at least partial curing the encapsulating material in the mould cavity.

3. The method as claimed in claim 1, wherein a flow of the conditioning gas is guided along at least the contact side of a surface defining the mould cavity.

4. The method as claimed in claim 1, wherein the conditioning gas is an inert gas.

5. The method as claimed in claim 4, wherein the inert gas is nitrogen.

6. The method as claimed in claim 1, wherein the conditioning gas is a reducing gas.

7. The method as claimed in claim 1, wherein the mould parts moved apart in step (c) include a support of the electronic component and an edge part of the mould.

8. The method as claimed in claim 1, wherein the releasing gas pressure is developed between the contact side of the mould and a side of the encapsulated electronic component directed toward the contact side of the mould.

9. The method as claimed in claim 1, wherein step (d) includes a side of the encapsulated electronic component directed toward a shape-defining surface of one of the mould parts being released as a wave front from said shape-defining surface.

10. The method as claimed in claim 1, wherein the releasing gas pressure is produced by a heated gas.

11. The method as claimed in claim 1, wherein the releasing gas pressure is reduced after full release of a side of the encapsulated electronic component directed toward a mould part.

* * * * *